Figure 1:
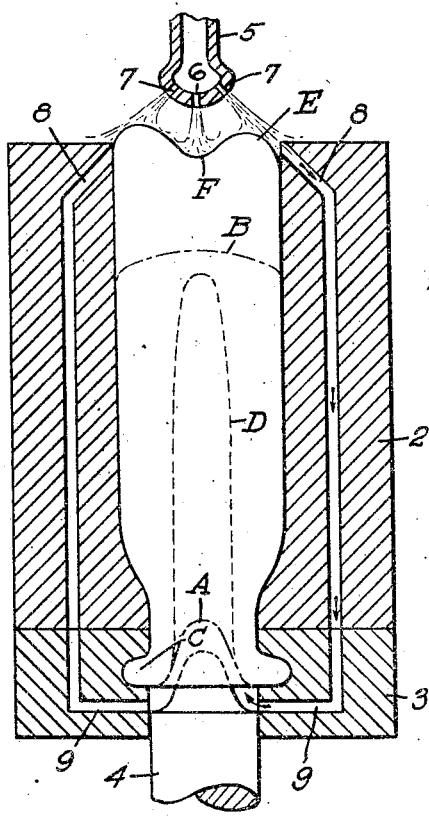

July 12, 1927.

G. E. HOWARD

METHOD AND APPARATUS FOR BLOWING GLASS PARISONS

Filed Sept. 29, 1925

1,635,716

Inventor
George E. Howard
by Robert D. Brown
Attorney.

Patented July 12, 1927.

1,635,715

UNITED STATES PATENT OFFICE.

GEORGE E. HOWARD, OF BUTLER, PENNSYLVANIA, ASSIGNOR TO HARTFORD-EMPIRE COMPANY, OF HARTFORD, CONNECTICUT, A CORPORATION OF DELAWARE.

METHOD AND APPARATUS FOR BLOWING GLASS PARISONS.

Application filed September 29, 1925. Serial No. 59,277.

My invention relates to the manufacture of parisons for bottles and other hollow glassware, and its general object is to provide a novel and efficient arrangement for accurately counter-blowing such parisons without the use of the baffle plate or bottom plate which is ordinarily employed for limiting the elongation of the glass in the parison mold.

Briefly stated, my invention contemplates depositing a charge of glass in a parison mold, settling the glass in the mold by ordinary means, then counter-blowing by air pressure while leaving the charging end of the mold open, and limiting the extent to which the glass may elongate in the mold by causing the expanding glass itself to automatically cut off the supply of counter-blowing air pressure.

In the ordinary system of making narrow-neck bottles and various other kinds of hollow glassware by the parison system, it is customary to settle the charge of glass in the parison mold by air pressure applied to the charging end of the mold so as to produce the finish at the neck of the bottle, and to produce an initial opening at the finish end, after which air pressure is applied to the finish end of the mold and expands the glass to fill the mold. My present invention is concerned with the last of these steps. Ordinarily, the charging end of the mold is closed by a baffle or bottom plate prior to the counter-blowing operation, in order to confine the glass and limit its elongation.

Attempts have been made to produce parisons without the use of baffle plates to limit the elongation of the blank during counter-blowing, but such attempts have not been successful, or have been successful to a limited extent only, because when a blank is counter-blown without a baffle plate it is difficult to control the final length of the blank. The air, even if constant in pressure, is expansible, and the blank, being composed of viscous glass, resists the air pressure in varying degrees, depending upon the skin tension of the glass and upon the particular manner in which the mold charge has entered the mold. Mold charges falling into blank molds do not fall into place exactly alike. A small difference in the uniformity of the charges causes the shears to deflect the charges more or less at the instant of severing so that the charges drop differently, some entering the mold evenly and establishing contact with the mold sides almost instantly over the entire side surface of the charge, while other charges may enter the mold somewhat unevenly, requiring an interval of settling before all parts of the mold charge come into proper contact with the mold. Thus, two mold charges of identical weight, fed from the same feeder into the same mold, may differ in the resistance which they offer to elongation. Therefore, if no bottom plate or baffle plate is provided on the parison mold, blanks of different length are likely to be produced, even though the air pressure is applied in exactly the same manner to the successive molds.

According to my present invention, I cause the glass itself, while being expanded in the parison mold, to cut off the counter-blowing air pressure by its position in the parison mold when it reaches the desired elongation. Therefore, the blanks produced according to my invention will be of equal length, even though they may differ slightly in their resistance to expansion.

Figure 2:
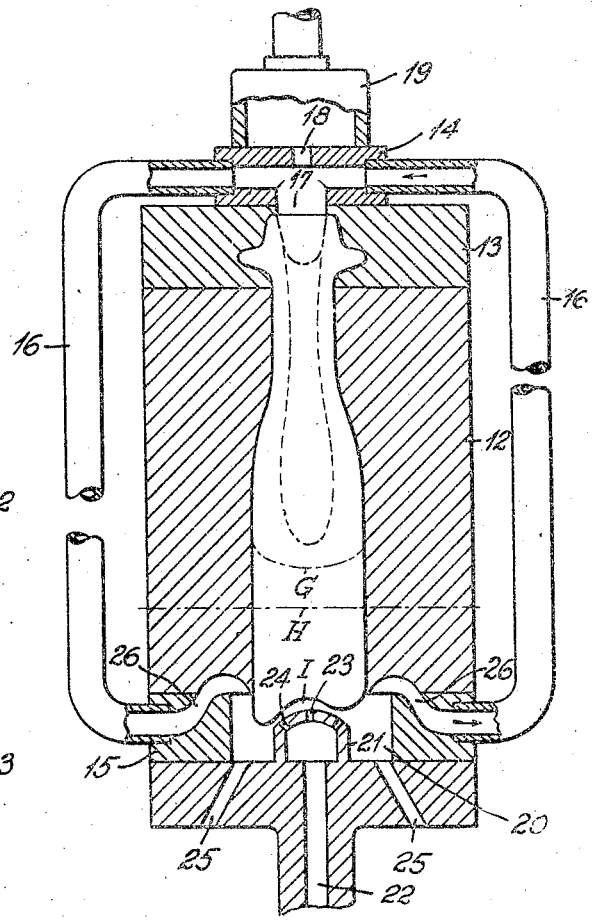

For a further understanding of my invention, reference may now be had to the accompanying drawing, in which:

Figure 1 is a vertical sectional view taken centrally through a mold and associated apparatus constructed in accordance with my invention; and Fig. 2 is a similar central section showing a modified construction. The structural features of the drawing are shown somewhat diagrammatically.

In Fig. 1 the numeral 2 indicates the body portion of a parison mold suitable for use in the manufacture of narrow-neck bottles, and the numeral 3 indicates the usual neck ring associated with the body mold 2. The neck ring 3 is provided with a central opening through which the usual neck plunger 4 is adapted to enter the molding cavity. Above the open upper end of the mold, at the counterblowing position, is a blowhead 5 having a central jet opening 6 and a number of inclined jet openings 7 disposed in a circle and directing air jets outwardly and downwardly. The air jets from the openings 7 are received in channels 8 formed in the body portion 2 of the mold, these channels extending downward to communicate with other channels 9 in the neck mold 3. The channels 9 discharge just above the shoulder of the plunger 4 when the plunger is in the position shown in Fig. 1.

In the operation of making a parison by the apparatus of Fig. 1, the parts of the mold are assembled, as shown, with the plunger raised to occupy the position shown in dotted lines at A. In the mold thus assembled is placed a charge B of molten glass, and this charge is compacted around the plunger 4 to form the neck finish C by the usual means, a blowhead being usually brought over the open end of the parison mold to supply the necessary pressure for such settling.

The mold is then brought to the counterblowing station, the plunger 4 being lowered to the position shown in Fig. 1 and the mold being brought under the blowhead 5, or the blowhead 5 being moved into position over the mold, as may be most convenient. Air is then blown through the blowhead 5, and issues in several jets. The lateral jets from the openings 7 of the blowhead enter the passages 8 and pass downwardly through the passages 8 and 9, finally entering the initial cavity in the glass just above the plunger. The air pressure thus induced expands the glass in the mold, producing a bubble which may take the form shown in dotted lines at D, and the expanding glass elongates in the mold until the upper edges E of the parison rise sufficiently to close the inlets of the passages 8. This automatically cuts off the counterblowing pressure. At the same time, the air jets impinging on the end of the parison give the bottom of the parison a somewhat chilled consistency, which is desirable when the parison is later expanded in a blow mold.

The jet of air issuing from the central opening 6 in the blowhead has little effect on the glass in the beginning of the expanding operation, as the opening 6 is small and the air is free to expand in the relatively large space in the interior of the mold. However, when the blank rises to the top of the mold, the jet 6 has an increased effect upon the glass, causing a slight concavity F in the end of the blank and tending to resist the elongating pressure of the air delivered to the glass through the passages 8 and 9. This central jet therefore assists in automatically limiting the expansion of the glass.

The apparatus of Fig. 2 employs the same principles as that of Fig. 1 and is designed particularly for counterblowing a blank in upright position. It is to be understood that the parison mold of Fig. 2 has been charged with glass in an inverted position and has been reverted before the counterblowing operation, with which the present invention is concerned. In Fig. 2 the body 12 and the neck portion 13 of the mold are, during the counterblowing operation, placed between upper and lower air boxes 14 and 15, which have lateral openings connected by pipes 16 which may suitably be composed of flexible tubing. The upper air box 14 has a large central opening 17 in its bottom communicating with the opening in the neck mold 13 and it also has a somewhat smaller upper opening 18 to admit air which may be supplied by means of a blowhead 19 for blowing an initial bubble in the glass.

The lower air box 15 has a central chamber 20 within which is a blowhead 21 supplied with air through a channel 22 and provided with a central outlet 23 and with a number of inclined lateral outlets 24. Channels 25, inclined outwardly and downwardly from the chamber 20, communicate with the outer air. Communication between the chamber 20 and the pipe 16 is made through channels 26 which open into the top of the chamber 20 outside of the mold cavity.

In the operation of the apparatus of Fig. 2, the mold-charging and settle-blowing operations are performed as in the apparatus of Fig. 1, the neck plunger being removed before the mold is brought to the position shown in the drawings. The glass at this time may fill the upper portion of the mold down to the line G. If desired, a puff of air may be introduced into the mold from the blowhead 19 to start the expansion of the blank until the bottom of the blank reaches some midway point, as for instance the line H. The elongation of the blank is continued, or is initiated if the blowhead 19 is not employed, by air introduced through the channel 22 and issuing through the openings 23 and 24 in the blowhead 21. The air from the lateral openings 24 is conducted from the passages 26 and the pipe 16 to the upper air box 14 and thence into the interior of the glass, thus causing the glass to elongate downward until the glass comes between the openings 24 and the inlets of the passages 26, at which time the elongating air pressure is automatically cut off and the air from the blowhead 21 is allowed to escape through the channels 25. Meanwhile, the air from the central opening 23, which at first has little effect upon the glass, has produced a central concavity I in the blank and has also assisted in balancing the weight of the glass, thereby tending to counteract the downward pressure of the air introduced into the upper end of the mold. All of the air jets operate to chill the end of the blank as in the apparatus of Fig. 1.

The successful operation of the apparatus herein shown and described requires proper selection of the air pressure, the sizes of the air openings, the time at which the air is supplied, and the duration of the air pressure.

It will be understood that various modifications in the construction and arrangement of the parts may be made without departing from my invention as set forth in the appended claims.

I claim as my invention:

1. The method of making blown glassware that comprises charging a parison mold with glass, compacting the glass in the parison mold by pressure applied through the open end of said mold, counterblowing the glass in said mold by air pressure applied at one end of said mold while leaving the opposite end of said mold open, and causing the displacement of said glass in said mold to automatically stop the said expansion when said expansion has proceeded to a predetermined extent.

2. Apparatus for making blown glass parisons, comprising a mold, means for applying air under pressure to the charging end of said mold, and means for conducting air from the charging end to the opposite end of said mold and for causing said air to expand glass in said mold toward the charging end thereof.

3. Apparatus for making blown glass parisons, comprising a mold, means for applying air under pressure to the charging end of said mold, and channels for conducting air from the charging end to the opposite end of said mold, the inlets of said channels being so disposed that the elongation of the glass in said mold toward the charging end thereof automatically interrupts the entry of air pressure into said inlets.

4. Apparatus for making blown glass parisons, comprising a mold, a blowhead adapted to discharge diverging jets of air under pressure adjacent to the charging end of said mold, and channels for receiving said air jets and conducting the air under pressure into the opposite end of said mold, the inlets of said channels being so disposed that the elongation of the glass in said mold automatically interrupts the entry of air pressure into said inlets.

5. Apparatus for making glass parisons, comprising a mold, air boxes arranged above and below said mold, pipes connecting said air boxes, and a blowhead disposed in one of said air boxes for directing air jets into said mold and into said pipes, and an opening in the other air box communicating with the interior of said mold.

6. Apparatus for making glass parisons, comprising a mold, air boxes arranged above and below said mold, pipes connecting said air boxes, and a blowhead disposed in one of said air boxes for directing air jets into said mold and into said pipes, an opening in the other air box communicating with the interior of said mold, and a blowhead adapted to introduce air into the last-named air box for initially elongating glass charges in said mold.

Signed at Butler, Pa., this 21st day of Sept., 1925.

GEORGE E. HOWARD.